(12) United States Patent
Schoeberl et al.

(10) Patent No.: US 10,473,239 B2
(45) Date of Patent: Nov. 12, 2019

(54) DEVICE FOR HOLDING A LINE IN A BEVERAGE FILLING SYSTEM

(71) Applicant: KRONES AG, Neutraubling (DE)

(72) Inventors: Wolfgang Schoeberl, Neutraubling (DE); Herrmann Johannes, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 15/580,250

(22) PCT Filed: Sep. 30, 2016

(86) PCT No.: PCT/EP2016/073420
§ 371 (c)(1),
(2) Date: Dec. 6, 2017

(87) PCT Pub. No.: WO2017/055546
PCT Pub. Date: Apr. 6, 2017

(65) Prior Publication Data
US 2018/0299032 A1    Oct. 18, 2018

(30) Foreign Application Priority Data
Oct. 1, 2015 (DE) .................. 10 2015 116 727

(51) Int. Cl.
*F16L 3/00* (2006.01)
*F16L 3/13* (2006.01)
*F16L 3/10* (2006.01)
*F16L 3/133* (2006.01)
*B67C 3/22* (2006.01)
*F16B 2/24* (2006.01)

(52) U.S. Cl.
CPC ...... *F16L 3/13* (2013.01); *B67C 3/22* (2013.01); *F16B 2/248* (2013.01); *F16L 3/10* (2013.01); *F16L 3/1066* (2013.01); *F16L 3/133* (2013.01)

(58) Field of Classification Search
CPC ...... F16L 3/133; F16L 3/24; F16L 3/14; F16L 3/237; F16L 3/233; F16L 3/22; F16L 3/11
USPC ...... 248/58, 59, 60, 61, 63, 74.1, 74.2, 74.3, 248/74.4, 302
See application file for complete search history.

(56) References Cited

U.S. PATENT DOCUMENTS

| 1,480,085 A | 1/1924 | Linard |
| 1,963,908 A | 6/1934 | Manasek |

(Continued)

FOREIGN PATENT DOCUMENTS

| CN | 2378627 | 5/2000 |
| CN | 1499117 | 5/2004 |

(Continued)

OTHER PUBLICATIONS

Office Action in related Chinese Patent Application No. 201680033715.4, dated Jan. 30, 2019.

*Primary Examiner* — Steven M Marsh
(74) *Attorney, Agent, or Firm* — Haynes and Boone, LLP

(57) ABSTRACT

A device for holding a line on a structure of a beverage filing system is described. The device includes a clamp having two legs shaped complementary to each other for holding the line between the legs in a clamping manner. The clamp includes a holder, which supports the legs and is provided for attaching the clamp to the structure of the beverage filling system, wherein the legs and the holder are bent from round wire as a single piece.

20 Claims, 5 Drawing Sheets

(56) References Cited

U.S. PATENT DOCUMENTS

| | | | | |
|---|---|---|---|---|
| 2,816,338 A | * | 12/1957 | Klancnik, Jr. | F16L 33/02 24/27 |
| 2,849,770 A | * | 9/1958 | Klancnik, Jr. | F16L 33/03 24/27 |
| 3,130,821 A | * | 4/1964 | Dunlap | E04B 9/16 403/398 |
| 4,750,651 A | | 6/1988 | Jan | |
| 2012/0047712 A1 | | 3/2012 | Miranda et al. | |

FOREIGN PATENT DOCUMENTS

| | | |
|---|---|---|
| CN | 103097793 | 5/2013 |
| EP | 0292781 | 11/1988 |
| EP | 0338340 | 10/1989 |
| FR | 1596785 | 6/1970 |

\* cited by examiner

DEVICE FOR HOLDING A LINE IN A BEVERAGE FILLING SYSTEM

CROSS REFERENCE TO RELATED APPLICATIONS

This application is a national stage of International Application No. PCT/EP2016/073420, filed Sep. 30, 2016, which claims priority from German Patent Application No. 10 2015 116 727.1 filed on Oct. 1, 2015 in the German Patent and Trademark Office, the disclosures of which are incorporated herein by reference in their entirety.

BACKGROUND

Technical Field

The present invention relates to a device for holding a line in a beverage filing system, in particular for holding lines conveying filling media, lines conveying operating media, and/or lines conveying control signals and energy in a beverage filing system.

Related Art

It is known for lines to be attached to the structures that hold them by means of pipe clamps. These pipe clamps are usually designed such that the line is inserted in the pipe clamp, a retaining part is then attached, and this retaining part is then screwed to the pipe clamp. With conventional pipe clamps, at least two screws need to be tightened in order by this means to join the two halves of the pipe clamp. Each pipe clamp also has a holder in the form of a welded-on threaded pin, by means of which the pipe clamp can then be fastened to the applicable supporting structure.

Along with their complex installation, conventional pipe clamps also have disadvantages related to hygiene. Such disadvantages are particularly undesirable in beverage filling systems. Up to three open threads are present, namely the two threads for connecting the two parts of the clamp, and the threaded pin for fastening the pipe clamp to the supporting structure. This leads to difficulty in cleaning the pipe clamps.

Furthermore, conventional pipe clamps create inaccessible areas between the supporting structure to which they are attached and the pipe clamps themselves. These areas can be cleaned only with difficulty. In other words, the space available between the pipe clamp and the supporting structure, which is determined by the threaded pin, is usually so small that satisfactory cleaning is highly complex or actually impossible. If the pipe clamp rests on a supporting structure via the threaded pin, the result is additional inaccessible surfaces on the supporting structure itself, which can be cleaned only with difficulty.

In addition, the installation of pipe clamps is time-consuming, and differing pipe clamps need to be provided for each diameter of pipe and for each position of the pipe clamp relative to the supporting structure, since the threaded pins must be also adapted to the distance between pipe clamp and supporting structure.

Furthermore, the necessity of tightening screws in three places can lead to tensions in the line, which can be caused, for example, by inaccuracies during installation or due to tolerances.

Such pipe clamps are known for example from DE 2 019 109.

From PI 0705402-5 A2, a line fastening system is known in which threaded connections can be dispensed with entirely, and a single-piece plastic part for accommodating the line is provided.

From JP 2014-119008 A, a further pipe support device is known, in which a metal plate is provided, into which the line can be inserted, and in which locking can be achieved by means of the provision of an additional locking clamp. The device is fixed to the supporting structure by means of a screw passing through the metal plate.

SUMMARY

The present disclosure describes a device for holding a line in a beverage filing system which has a simplified design along with improved hygienic properties.

A device for holding a line on a structure of a beverage filing system is described, including a clamp having two legs shaped complementary to each other for holding the line between the legs in a clamping manner, and including a holder which supports the legs and is provided for attaching the clamp to the structure of the beverage filling system. The legs and the holder are bent from round wire as a single piece.

Due to the fact that the legs and the holder are bent from round wire as a single piece, it can firstly be achieved that the hygienic properties of the device are significantly improved, since, due to its design as a single piece and its formation from round wire, the presence of undercuts, joints, grooves, welds etc. is reduced or excluded. This makes the device easier to clean, and at the same time avoids horizontal surfaces upon which fluids could remain. By means of the device, therefore, significantly improved hygienic outcomes can be achieved.

In addition, the single piece design of the clamp with the legs and the holder from bent round wire makes it possible to manufacture the device particularly efficiently, and thus provide the clamp in a cost-effective manner. A material can be chosen for the round wire which meets each of the requirements concerning hygiene, elasticity, temperature resistance, corrosion resistance and stiffness. Flexible adaptation of the clamps is accordingly possible, at the same time achieving cost-effective manufacture and hence cost-effective provision of the clamps. Conventional round wires can be used in this case as the round wire, so that the production of complex semi-finished parts etc. can also be dispensed with. Furthermore, methods for bending wires, in particular for bending round wire into a specified shape, are well known, with the result that the entire manufacturing process can be simplified.

In addition, due to the fact that the clamp is implemented such that two legs, bent to be complementary to each other, are provided, between which the line can be held in a clamping manner, installation is simple, since the applicable line needs only to be pushed into the clamp in order for it to be immediately held in a clamping manner. This also reduces the steps needed to install the device for holding the line, in particular by comparison with the pipe clamps that are conventionally used, since the clamping device does not require screws in order to hold the lines, thus enabling the required work steps to be reduced. Furthermore, due to the fact that the line is held in a clamping manner, tensions in the line during installation are also avoided, since the line can first be held between the two legs which are bent to be complementary to each other, and can then be fastened by the holder of the clamp to the applicable supporting structure at the correct height.

By means of the proposed design of the clamps, it can additionally be achieved that inaccessible surfaces and spaces, which can be cleaned only with difficulty, are avoided when the clamp has been installed.

The clamp, in various embodiments, has a mouth for inserting the line between the legs, and the holder is disposed on the side of the clamp that faces away from the mouth. By this means it is possible to achieve simple installation, since the line needs only to be pushed through the mouth into the clamp.

The dimensions of the legs of the clamp are, in one or more embodiments, such that a line can be accommodated between the two legs such that a contact point of each leg with the line is on the side of the line which faces the mouth. By this means it is possible to achieve secure clamping, which, not only for reasons of friction but also for structural reasons, enables the line to be held securely between the legs.

In order at this point to achieve a particular relationship between retention force and ease of insertion, a straight line intersecting the middle axis of the line and the applicable contact point forms an angle with a mid-point straight line intersecting the middle axis of the line which is parallel to a straight line that connects the two contact points, said angle being within the range 10° to 20°, and, in one embodiment, 17°. When the holder is designed to be straight, the mid-point straight line coincides with a mid-point straight line that intersects the middle axis and is perpendicular to the direction in which the holder extends.

The dimensions of the holder of the clamp are, in several embodiments, such that a specified distance can be achieved between the structure of the beverage filling system to which the clamp is to be fastened and the line. By this means it is possible, for example, to allow for a gradient to be established in the line along its extent, in a simple and reliable manner using the same type of clamp. This is particularly important in the case of lines which convey media. The holder of the clamp is thus generally long enough to enable the same type of clamp to be used in all positions at which the line is fastened, while still permitting the gradient to be established in the line.

A clamping device is, in several embodiments, provided for fastening the holder in a clamping manner to the structure of the beverage filling system. Thus the clamp can be attached by the holder, and in this manner retained on the structure of the beverage filling system.

In this case it is advantageous for the clamping device to have a clamping part with channels for at least two strands of the round wire of the holder of the clamp. Particularly, the clamping part has a bolt for fastening the clamping part to the structure of the beverage filling system, in order to enable flexible adaptation to differing modes of fastening.

The clamping device, in certain embodiments, has a spacer, which is inserted between strands of the round wire of the holder, and provides a predetermined spacing between the strands, wherein the spacer is, in several embodiments, formed from ethylene propylene diene monomer (EPDM), and wherein the spacer particularly accommodates, in a drilled hole, a bolt of the clamping part. The spacer can further improve the structural integrity of the clamp in its fastened state. Because the bolt is accommodated, covering of the bolt can be achieved, resulting in a further improvement of the hygienic properties. The spacer also serves as a filler element for preventing contamination.

In certain embodiments, the clamping device has a retaining part, which has channels for at least two strands of the round wire of the holder of the clamp. The retaining part also has an anti-rotation device for accommodating the retaining part non-rotatably on the structure of the beverage filling system, wherein the retaining part particularly cooperates with the clamping part, and the at least two strands of the round wire of the holder of the clamp are clamped in the channels between the clamping part and the retaining part, particularly with a spacer accommodated at the same time between the strands. By means of the retaining part designed in this manner, the clamp can be held securely and non-rotatably on the structure of the beverage filling system.

Due in particular to the fastening of the clamping device and the provision of the two channels arranged parallel to each other, it is achieved that the pivot point, around which the two legs of the clamp can be elastically pivoted, moves from the position of the wire loop at the foot of the two strands of the holder, to the position of the clamping device. In other words, the lever arm by means of which elastic deformation of the legs can take place is reduced in length by the fastening of the clamping device. Accordingly, the fastening of the clamping device also fastens the line in the clamp.

In this case the dimensions of the holder are such that the clamp is displaceable relative to the non-fixed clamping device. This makes it possible to achieve an adjustment in height or distance, which results in simplified adjustment of the clamp and thereby of the relative positioning of the line and clamp.

Because a clamping device is provided for accommodating the holder, the holder can be displaced relative to the clamping device, which is then fastened to the structure of the beverage filling system, such that the line, which is accommodated in a clamping manner between the two legs, can be held without tension.

In an additional advantageous further development, the clamp has at least one locking receptacle on a leg, which is provided for accommodating a locking element, wherein the locking receptacle is, in some embodiments, in the form of a bent hook in the round wire, forming a single piece with the leg. By means of the provision of the locking receptacle, it is accordingly possible to achieve locking of the clamp additional to the locking provided by the clamping action. This results in even more secure locking of the line in the clamp.

In certain embodiments, the clamp has, at the end of each of the legs, which are bent to be complementary to each other, a receptacle region, which is bent outwards in each case, for a locking element, and a locking element is provided, which connects the two receptacle regions. The locking element thereby encompasses the line that is accommodated between the legs, so that the line is then fully encircled by the clamp and the locking element, and a secure connection and secure retention of the line in the device is achieved.

In several embodiments, a locking receptacle is provided on each leg, and the locking element has two wire loops, each of which can be hooked into one of the locking receptacles, wherein the wire loops are connected with each other via a locking lever, and the locking lever is pivotably connected with the first wire loop via a first locking axle, and with the second wire loop via a second locking axle, wherein the two locking axles do not coincide. By this means a locking element can be provided in a form that is simple to manufacture and which can be utilized for secure locking of the clamp.

The locking lever is advantageously bent such that, in the locked position, it is shielded by at least one of the wire loops, so that unintentional opening of the locking lever is prevented. In an installed state, it can thereby be ensured that the locking is maintained. Particularly, the design of the locking lever and the force which retains it in the locked position are such that unlocking can only be achieved by means of a tool, and as a minimum cannot be achieved with bare hands.

The clamp is, in one or more embodiments, fully axially symmetrical in its design with respect to a middle axis, wherein the middle axis coincides with the direction of insertion of the line, or direction of latching of the line, between the two legs which are bent complementary to each other.

The holder typically has two wire rails, parallel to each other, which end in a loop at the end facing away from the mouth, so that the round wire is, as it were, turned back to run parallel to itself. In the region of the holder in which the two strands of the round wire run parallel to each other, it can be achieved via the clamping device that the clamp has an attachment point to the structure of the beverage filling system which permits the length of the clamp to be varied relative to the clamping device. In this manner a tension-free installation of lines can be achieved, by means of the insertion of the line as a first step, and then the displacement of the holder relative to the clamping device until the line is held without tension.

BRIEF DESCRIPTION OF THE FIGURES

Further embodiments of the invention are more fully explained by the description below of the figures.

DETAILED DESCRIPTION

Examples of embodiments are described below with the aid of the figures. In the figures, elements which are identical or similar, or have identical effects, are designated with identical reference signs. In order to avoid redundancy, repeated description of these elements is in part dispensed with in the description below.

Figure 1:
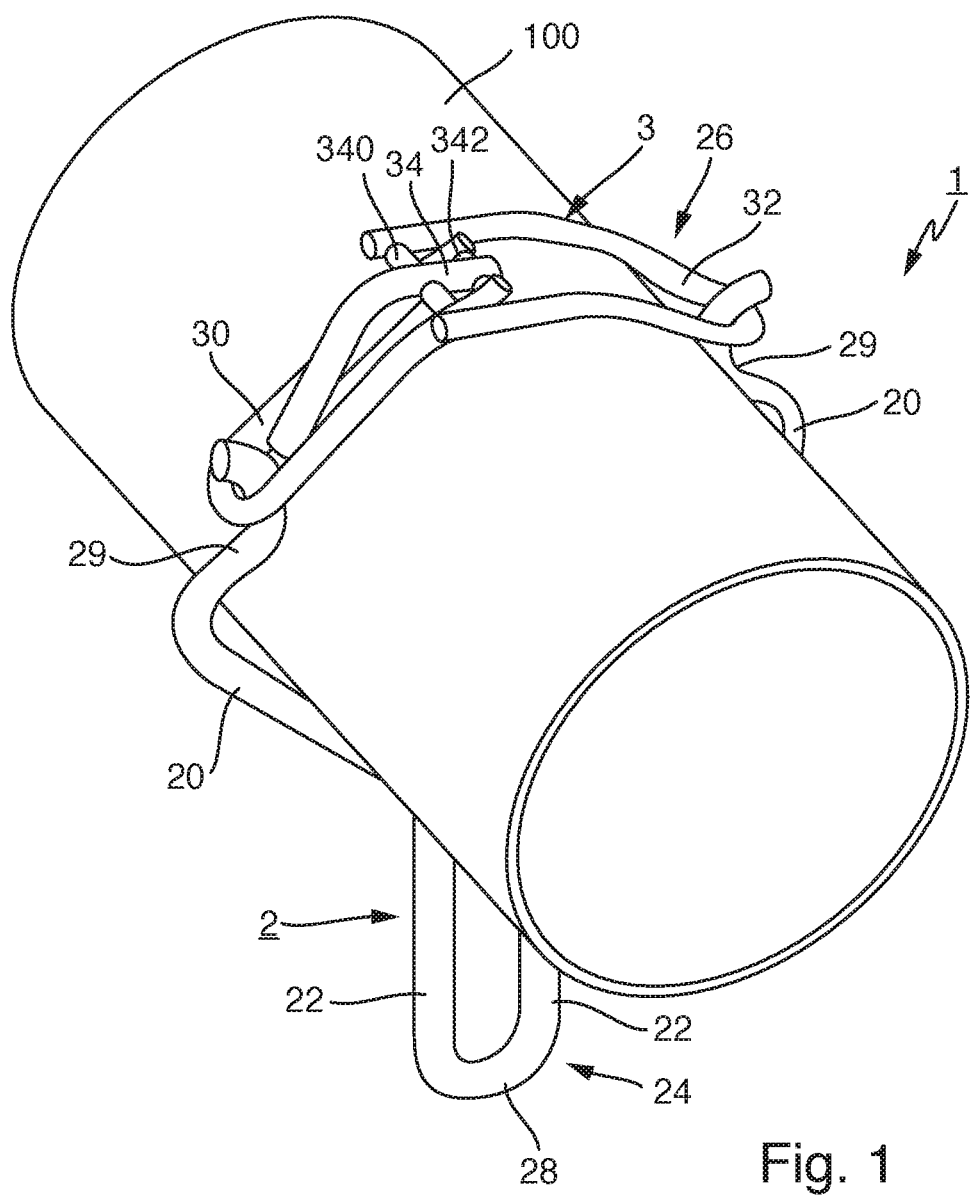
FIG. 1 is a schematic perspective view of a device for holding a line in a beverage filling system, wherein a locking element is shown in a locked position.

FIG. 1 shows schematically a perspective view of a device 1 for holding a schematically represented line 100 in a beverage filling system.

The device 1 comprises a clamp 2, in which the schematically represented line 100 is accommodated in a clamping manner. The clamp 2 has two legs 20, bent complementary to each other, between which the line 100 is accommodated in a clamping manner, so that the clamping action in itself holds the line 100 in the clamp 2. The line can thereby be inserted through a mouth 26 formed between the two legs 20 such that it is clamped between the two legs 20.

The two legs 20 of the clamp 2 are connected to a holder 24 of the clamp 2. The holder 24 of the clamp 2 enables the clamp 2 to be fastened to a structure of the beverage filling system, in a manner to be further described below.

The clamp 2 is formed as a single piece from round wire by bending, as can be immediately recognized from the schematic FIG. 1. Each leg 20 extends to form one strand 22 of the holder 24, with the two strands 22 of the holder 24 formed parallel to each other. The two strands 22 of the holder 24 are connected to each other via a loop in the wire 28, wherein the wire loop 28 is opposite the mouth 26 of the clamp 20.

Accordingly, the round wire runs from one leg 20 via the strand 22 of the holder 24 to the loop 28, and then via the second strand 22 of the holder 24 to the leg 20 which is complementary to the first leg 20.

In this manner it is possible cost-effectively to produce a bent wire part from round wire, wherein the round wire can have material properties that are appropriate to the intended use in each case. The round wire can for example be formed from a material which meets the requirements of the applicable clamping device with regard to elasticity and stiffness. The material of the round wire can additionally have the desired corrosion resistance and surface properties, so that hygienic aspects can also be taken into account in the choice of material.

It is immediately clear that the clamp 2 can also have a particularly hygienic structure, due to the fact that it is designed as a single piece of bent round wire, since it includes no joints, welds, grooves, ridges etc. in which dirt could accumulate. In addition, by means of the design using round wire, it is also possible to avoid the presence of horizontal surfaces, upon which fluids could remain and lead to hygiene problems.

Clamp 2 also has two locking receptacles 29, which are provided to accommodate a locking element 3. The locking element 3 is provided in order to achieve a fully secure accommodation of the line 100 in the clamp 2, so that the line 100 is no longer retained only by the clamping action of the clamp 2, but also by being fully encircled. Thus the locking element 3 can be designed such that it applies a further pretension via the locking receptacles 29 to the legs 20, and accordingly achieves an accommodation of the line 100 which is free of play even when subject to high loads.

In the example embodiment that is shown, each locking receptacle 29 is in the form of a bent hook in the round wire, forming a single piece with the leg 20. By this means the locking receptacles 29 can also be designed in a single piece with the clamp 2 as simple bent wire parts.

The locking element 3 has two wire loops 30, 32, each of which engages with its looped section in one of the locking receptacles 29 of the clamp 2, thereby being retained in the clamp 2. The two wire loops 30, 32 of the locking element 3 are connected with each other via a locking lever 34. The locking lever 34 is pivotably connected with the first wire loop 30 by means of a first locking axle 340, and with the second wire loop 32 by means of a second locking axle 342. The two locking axles 340, 342 do not coincide, with the result that a pivoting operation of the locking lever 34 about one of the two locking axles 340, 342, or about an axis lying between these locking axles 340, 342, can cause the two wire loops 30, 32 to change position relative to each other. The distance between the two locking axles 340, 342 is chosen such that the displacement that results from a pivoting of the locking lever 34 achieves a reliable pretension or locking of the locking element 3 in the locking receptacles 29. Thus by means of pivoting the locking lever 34, the locking element 3 can lie firmly against the line 100, and the two locking receptacles 29 can be pretensioned towards each other, so that a secure fit of the line 100 in the two legs 20 is achieved.

The positions of the two locking axles 340, 342, and the distance between them, is also chosen such that a closing force in the direction of closing is exerted upon the locking lever 34. In other words, the locking lever 34 is held in the locked position due to the pretension which it applies. The locking element 3 is thus designed to be self-locking.

When the locking element 3 is locked, it can only be opened, i.e. unlocked, by means of a tool, wherein the locking lever 34 is designed such that, as a minimum, it cannot be opened with bare hands. In one embodiment, the strength of the force exerted on the locking lever 34 in the direction of locking is also sufficient to prevent opening without a tool.

Figure 2:
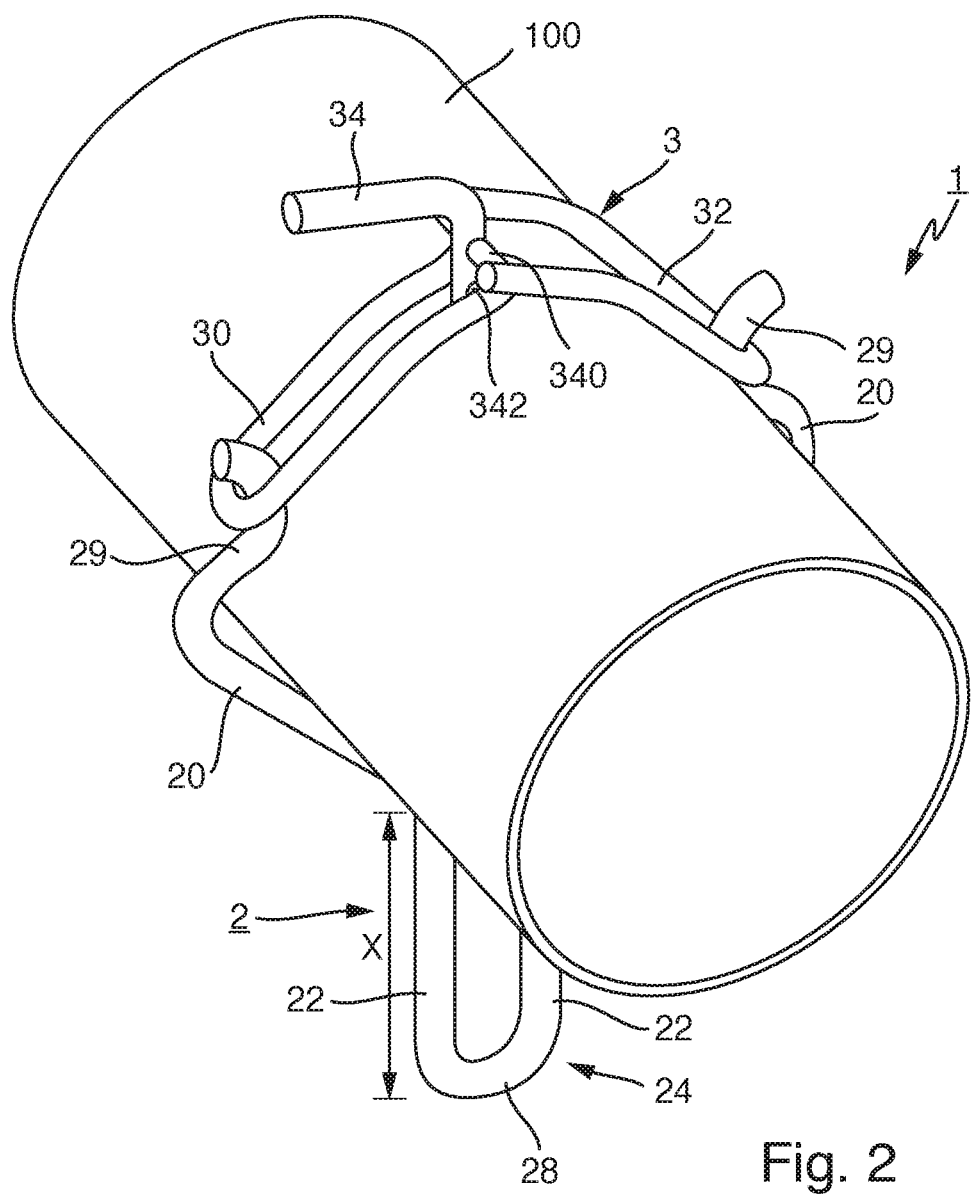
FIG. 2 is a schematic perspective representation of the device for holding a line from FIG. 1, wherein the locking element is shown in an opened position.

FIG. 2 shows the device 1 for holding the line 100 in a state in which the locking element 3 is opened and the locking lever 34 is arranged in a released position. The two wire loops 30, 32 of the locking element 3 are thereby not held under tension in the locking receptacles 29 of the clamp 2, but are held only loosely at these points. To achieve this state, the locking lever 34 has been pivoted such that the two locking axles 340, 342 have been displaced towards each other such as to move the two wire loops 30, 32 correspondingly apart relative to each other, thus releasing the lock that was shown in FIG. 1. The locking element 3 can accordingly be lifted out of the locking receptacles 29, and the line 100 can be removed. In this state, the locking element 3 can of course also be placed back on the locking receptacles 29 in order to lock a line 100 that is accommodated between the legs 20.

In FIGS. 1 and 2, it can also be seen in the region of the holder 24 that, due to the provision of the two parallel strands 22, fastening of the holder 24 can take place within a region designated with the reference sign X. In other words, due to the particular design of the holder 24, the clamp 2 can be fastened to a structure of the beverage filling system in differing positions.

Figure 3:
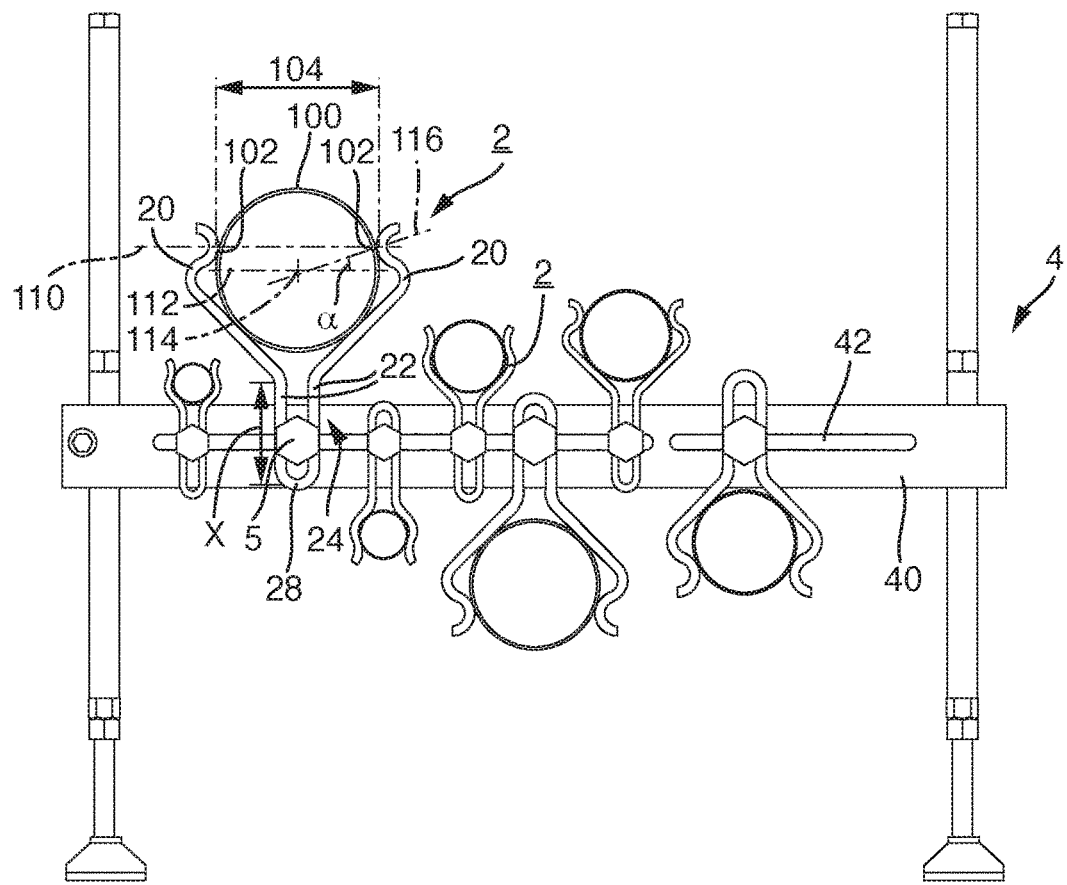
FIG. 3 is a schematic plan view of a device for holding a line in a beverage filling system, wherein a plurality of clamps for holding lines are fastened to a structure of the beverage filling system.

The fastening of the clamp 2 in the region of its holder 24 to a structure 4 of the beverage filling system is shown schematically in FIG. 3. The structure 4 of the beverage filling system is shown in the form of a support stand, which has a panel 40 to which several differently dimensioned clamps 2 are attached. The panel 40, in several embodiments, has no upwards-facing horizontal surfaces, in order that fluids can flow away without problems, thereby enabling simple cleaning and good hygiene.

The various clamps 2 that are attached to the panel 40 each hold lines 100, which are accommodated in a clamping manner between their legs 20. In other words, no locking element 3 is present. Instead, the lines 100 are retained only due to the clamping action and the fixing in place by means of the fastening of the clamp 2.

The dimensions of the holder 24 of the clamp 2 are, in various embodiments, such that a specified distance can be achieved between the structure of the beverage filling system, i.e. the panel 40, and the line 100. By this means it is possible, for example, to allow for a gradient to be established in the line 100 along its extent, in a simple and reliable manner using the same type of clamp. This is particularly important in the case of lines 100 which convey media. The holder 24 of the clamp 2 is thus, in some embodiments, long enough to enable the same type of clamp to be used in all positions at which the line 100 is fastened, while still permitting the gradient to be established in the line 100.

It can also be seen in FIG. 3 that the clamping of the line 100 takes place in that the contact point 102 between the leg 20 and the line 100 is outside a maximum diameter 104 of the line 100. In other words, the line 100 is inserted between the two legs 20 of the clamp 2, which are formed symmetrically to each other, far enough for the legs 20 to spring back to a certain extent, thereby clamping the line 100 securely within.

The contact points 102 form a straight line 110 between them. Parallel to this straight line, a mid-point straight line 112 intersects the line axis 114 of the line 100. The mid-point straight line 112 forms an angle $\alpha$ with a straight line 116 passing through the line axis 114 and a contact point 102. The angle $\alpha$ is typically within the range 10° to 20°, and is, in one embodiment, 17°. In this manner, a particular relationship can be achieved between high retention force and ease of insertion of the line 100 in the clamp 2.

Regarding the holder 24, it can easily be seen from the differing examples in FIG. 3 that the region X, which is formed on the holder by the two parallel strands 22 of the round wire, enables an adjustment in height, or an adjustment with respect to the structure 4 of the beverage filling system as represented by the panel 40. Accordingly, the length of the clamp 2 can be adjusted in a simple manner by displacing the holder 24 relative to a clamping device 5, which is described below.

Figure 4:
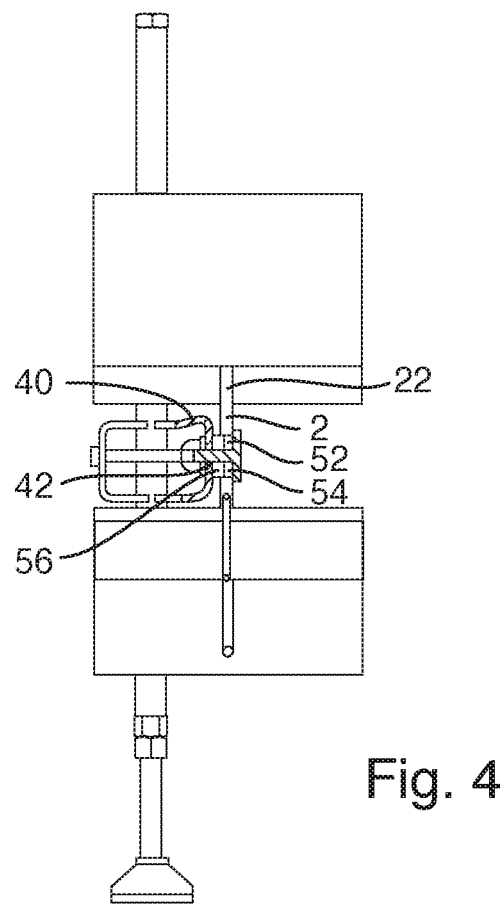
FIG. 4 is a sectional view through the device for holding a line that is shown in FIG. 3.
Figure 5:
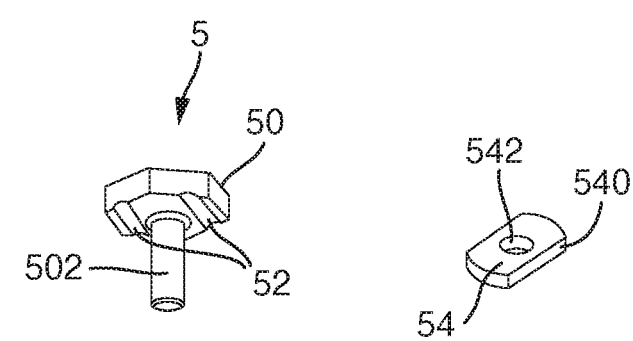
FIG. 5 is a schematic representation of various components of a clamping device for clamping a clamp of the device for holding a line.
Figure 5:
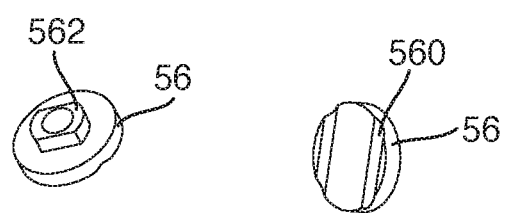

The structure of the clamping device 5 for clamping or retaining the clamp 2 on the structure 4 of the beverage filling system is represented schematically in FIGS. 4 and 5. FIG. 5 shows the individual components of the clamping device 5.

The clamping device 5 thus has, for example, a clamping part 50, comprising two channels 52 disposed parallel to each other, which are provided for accommodating the two strands 22 of the holder 24. The two channels 52 accordingly have a cross sectional radius corresponding to the radius of the round wire that is used for the clamp 2. Because the two guide channels 52 are arranged in parallel, the two strands 22 of the holder 24 cannot be moved relative to each other when they are fixedly accommodated in the two guide channels 52, with the result that the pivot axis of possible elastic pivoting of the two legs 20 relative to each other moves from the wire loop 28 to the position of the clamping part 50, i.e. to the position of the clamping device 5. By this means the overall leverage of possible elastic pivoting is reduced, so that the elasticity of the two legs 20 relative to each other is also reduced, which correspondingly results in an increased clamping effect on the line 100 when the clamping device 5 is attached.

In FIG. 5, a further component of the clamping device 5 is provided in the form of a spacer 54, which is inserted between the two strands 22 of the holder 24. The spacer 54 thus also has two parallel channels 52, whose cross sectional radius corresponds to the cross sectional radius of the round wire of the clamp 2. The spacer 54 also has a drilled hole 542, through which a threaded bolt 502 of the clamping part 50 can be passed.

A retaining part 56 is also provided as a component of the clamping device 5. This too has guide channels 560 on one of its sides, into which the two strands 22 of the holder 24 can be inserted. On the rear side of the retaining part 56, an anti-rotation device 562 is provided, which enables the retaining part 56 to be retained non-rotatably in an elongated hole 42 on the panel 40, and thereby retained on the structure 4 of the beverage filling system.

Accordingly, as shown for example in FIG. 4, the round wire of the clamp 2, i.e. the two strands 22 of the holder 24 of the clamp 2, are each clamped between the clamping part 50 and the retaining part 56, with each of the strands 22 accommodated in the channels 52, 560. Between the strands 22, the spacer 54 is also generally provided. The retaining part 56 is non-rotatably retained in the panel 40, or in an elongated hole 42 in the panel 40. The clamp 2 is thereby reliably clamped in the panel 40.

In this manner, the basic principles of hygienic design are also complied with, and few joints or surfaces are provided, with all surfaces provided in an oblique form so that fluids can run off.

The spacer 54 is typically formed from EPDM, and by means of its drilled hole 542 covers a difficult-to-clean thread of the clamping part 50.

Figure 6:
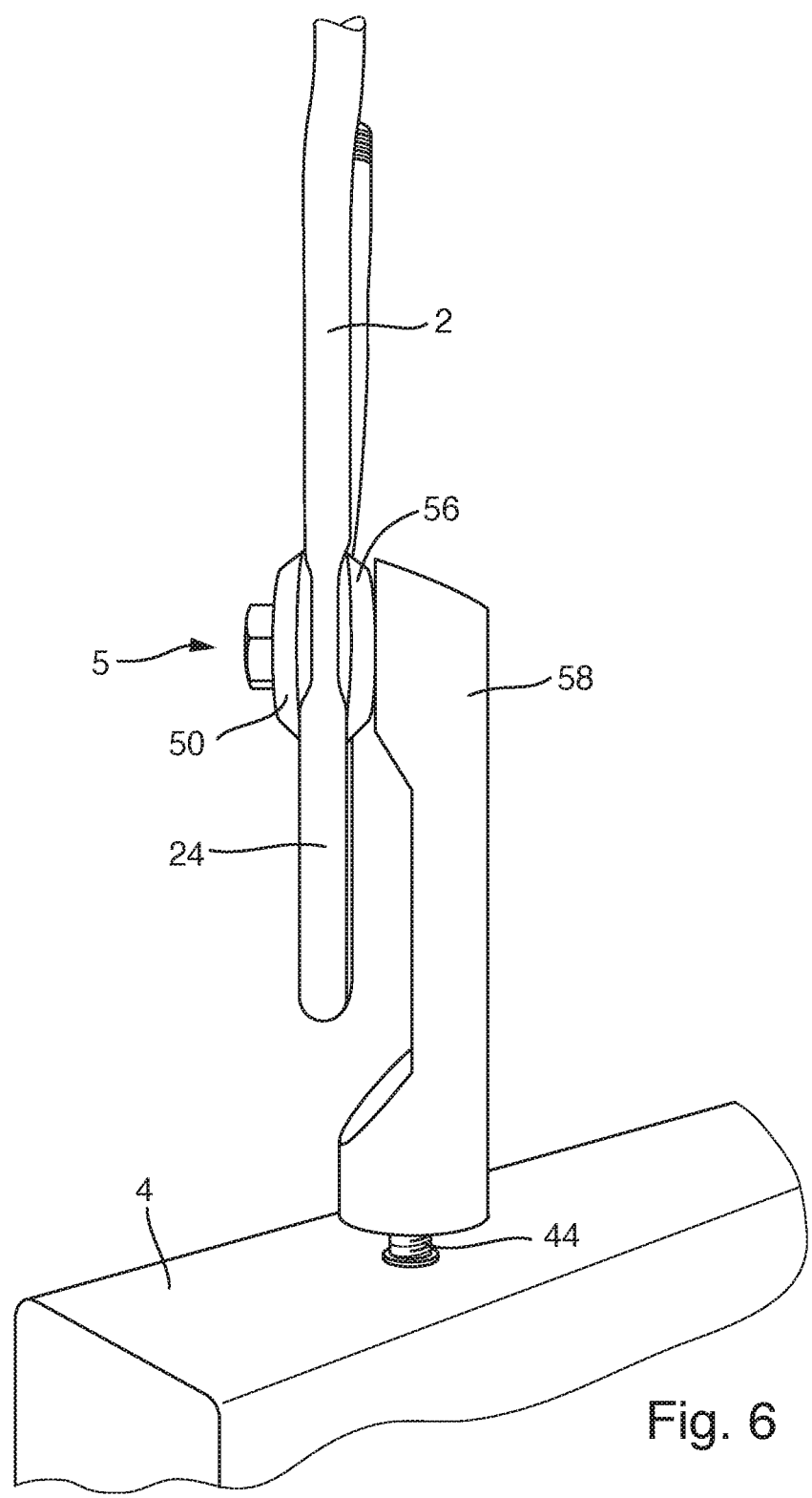
FIG. 6 is a schematic perspective representation of a further device for holding a line.

FIG. 6 shows a further design of a device 1. Here the clamp 2 is designed as described above. In the region of the holder 24 of the clamp 2 a clamping device 5 is provided, which has a clamping part 50 and a retaining part 56. The clamping device 5 is held on an extension 58, which is screwed onto a threaded pin 44 in the structure 4 of the beverage filling system. The threaded pin 44 is, in some embodiments, riveted into the structure 4.

Unlike the retaining part described above, the retaining part 56 has no anti-rotation device on its rear side, and so is rotatably accommodated on the extension 58, at least during its installation. As a result, the orientation of clamp 2 is particularly flexible, since the extension 58 can be rotated about the threaded pin 44, and in addition the clamp 2, due to the absence of an anti-rotation device, can be rotated about the clamping device 5.

A seal is, in some embodiments, provided around the threaded pin 44 between the extension 58 and the structure 4 of the beverage filling system, in order to achieve reliable sealing and a hygienically acceptable design. In order to achieve good adjustability, it is desired in certain embodiments for the seal to be designed such that it forms a reliable seal even in the event of a full rotation of the extension 58 about the threaded pin 44.

To the extent applicable, all individual features described in the individual example embodiments can be combined with each other and/or exchanged, without departing from the field of the invention.

The invention claimed is:

1. A device for holding a line on a structure of a beverage filing system, comprising:
   a clamp comprising:
      two legs shaped complementary to each other, wherein the two legs are configured to hold the line between the two legs in a clamping manner, and
      a holder configured to support the two legs and attach the clamp to the structure of the beverage filling system at a specified distance from the line,
   wherein the two legs and the holder are formed as a single piece from a round wire, and the holder is adjustable to provide a plurality of different distances between the structure of the beverage filling plant and the line.

2. The device of claim 1, wherein the two legs form an opening.

3. The device of claim 2, wherein the holder is disposed on a side of the clamp that faces away from the opening.

4. The device of claim 1, wherein an angle between (i) a straight line that passes through a mid-point of the line and (ii) a straight line that intersects the mid-point and a contact point of the clamp and the line is about 10° to 20°.

5. The device of claim 4, wherein the angle is about 17°.

6. The device of claim 1, further comprising a clamping device configured to fasten the holder in a clamping manner to the structure of the beverage filling system.

7. The device of claim 6, wherein the clamping device comprises a clamping part with channels configured to hold at least two strands of the round wire of the holder.

8. The device of claim 7, wherein the clamping part comprises a bolt configured to fasten the clamping part to the structure of the beverage filling system.

9. The device of claim 8, wherein the clamping device further comprises a spacer configured to be inserted between strands of the round wire of the holder, and to provide a predetermined spacing between the strands.

10. The device of claim 9, wherein the spacer comprises ethylene propylene diene monomer (EPDM).

11. The device of claim 9, wherein the spacer is configured to accommodate a bolt of the clamping part in a drilled hole.

12. The device of claim 7, wherein the clamping device further comprises a retaining part, wherein the retaining part comprises channels configured to retain the at least two strands of the round wire of the holder.

13. The device of claim 12, wherein the retaining part comprises an anti-rotation device configured to accommodate the retaining part non-rotatably on the structure of the beverage filling system.

14. The device of claim 12, wherein the at least two strands of the round wire of the holder are clamped in the channels of the clamping part and the channels of the retaining part with a spacer accommodated between the at least two strands.

15. A device for holding a line on a structure of a beverage filing system, comprising:
   a clamp comprising:
      two legs shaped complementary to each other, wherein the two legs are configured to hold the line between the two legs in a clamping manner,
      a holder configured to support the two legs and attach the clamp to the structure of the beverage filling system, wherein the two legs and the holder are formed as a single piece from a round wire, and
      a locking receptacle on each of the two legs, wherein the locking receptacle is in the form of a bent hook in the round wire and configured to accommodate a locking element, the locking element comprising two wire loops configured to be hooked into the locking receptacle, wherein the two wire loops are connected with each other via a locking lever.

16. The device of claim 15, wherein the locking lever is pivotably connected with a first wire loop via a first locking axle and with a second wire loop via a second locking axle.

17. The device of claim 15, wherein the locking lever is bent such that, in a locked position, the locking lever is shielded by at least one of the two wire loops.

18. The device of claim 1, further comprising a locking receptacle on each of the two legs, wherein the locking receptacle is in the form of a bent hook in the round wire and configured to accommodate a locking element, the locking element comprising two wire loops configured to be hooked into the locking receptacle, wherein the two wire loops are connected with each other via a locking lever.

19. The device of claim 1, wherein the holder is further configured to adjust a length of the clamp during a displacement of the holder relative to a clamping device that is fastened to the structure of the beverage filling system.

20. The device of claim 15, further comprising a clamping device configured to fasten the holder in a clamping manner to the structure of the beverage filling system.

\* \* \* \* \*